D. Wolf.

Harvester Droppers.

No. 2318 Reissued Jul. 17, 1866

Witnesses:

Henry Morris

Wm. P. McNamara

Inventor:

David Wolf per Munn & Co attys

UNITED STATES PATENT OFFICE.

DAVID WOLF, OF LEBANON, PENNSYLVANIA.

IMPROVEMENT IN REAPING-MACHINES.

Specification forming part of Letters Patent No. 46,169, dated January 31, 1865; Reissue No. 2,318, dated July 17, 1866.

*To all whom it may concern:*

Be it known that I, DAVID WOLF, of Lebanon, in the county of Lebanon and State of Pennsylvania, have invented a new and Improved Platform for Reapers; and I do hereby declare that the following is a full, clear, and exact description thereof, which will enable others skilled in the art to make and use the same, reference being had to the accompanying drawings, forming part of this specification, in which—

Figure 1:
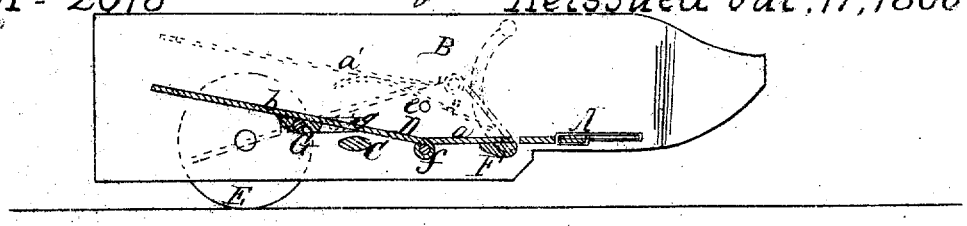
Figure 2:
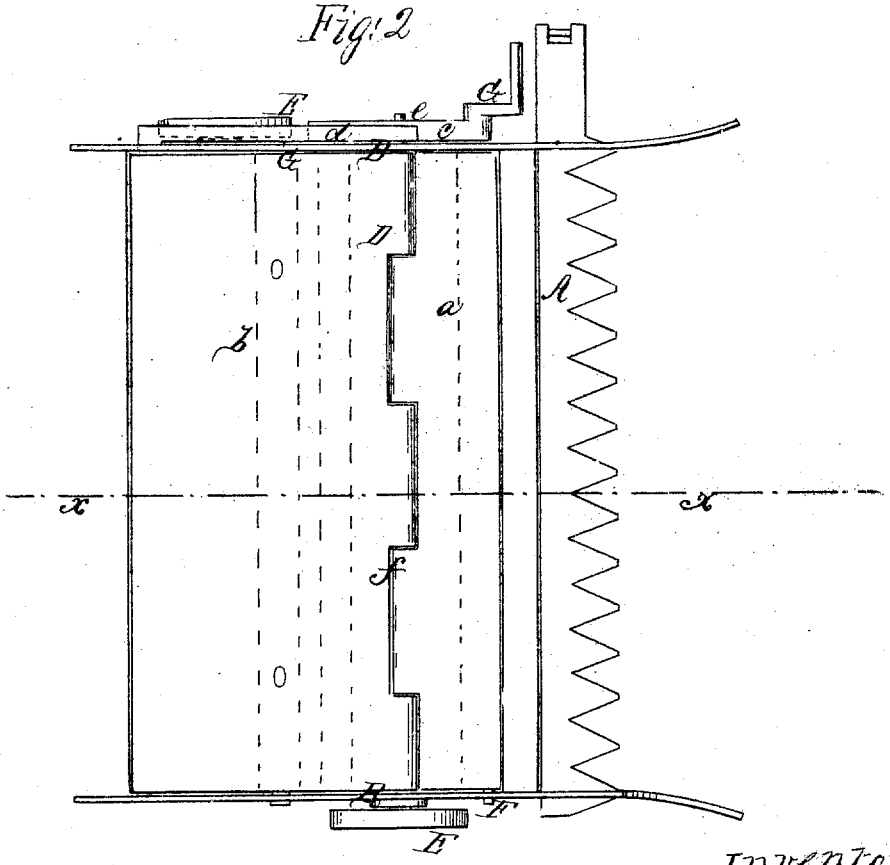

Figure 1 is a side sectional view of my invention, taken in the line *x x*, Fig. 2; Fig. 2, a plan or top view of the same.

Similar letters of references indicate like parts.

This invention consists in constructing and arranging the platform of a reaping-machine in such a manner that it may be made to vibrate or tilt at the will of the operator, and by said motion discharge the cut grain from it without the aid of a rake or any appliance or extraneous device hitherto employed for such purpose.

A represents the sickle-bar of a reaper, the ends of which are secured to two side pieces, B B, connected by a cross-bar, C, which constitute the frame of the platform.

D represents the platform, which is composed of two parts, *a b*, the latter being considerably wider than the former, and both parts extending the whole width of the space between the side pieces, B B.

The frame and platform are mounted on wheels E E, one at each side, and the front edge of the part *a* of the platform is attached to a bar, F, which is provided with journals at its ends, said journals passing through the side pieces, B B, and allowed to turn freely therein.

One of the journals of the bar F is provided with a crank, G, and said journal has a spring, *c*, attached to it, upon which another spring, *d*, bears, the latter being secured to the outer part of one of the side pieces, B, the spring *c* resting or bearing on a pin or stop, *e*, attached to said side piece.

The front edge of the back part, *b*, of the platform is attached to the back edge of the part *a* by means of a hinge or joint, *f*, and to the under side of the part *b* there is attached a bar, G, the ends of which pass through horizontal oblong slots *g* in the side pieces, B B, and serve as guides for said parts.

The slots *g g* are a trifle above the level of the journals of the bar F of the front part, *a*, of the platform, and as the spring *d* bears upon the spring *c* the two parts *a b* will have an oblique position relatively with each other, so as to give the platform a concave form, as shown in Fig. 1.

It is designed to have the platform D of such a length that the cut grain upon it will project beyond its back edge and be about balanced on the platform; and it will be seen from the above description that by actuating the crank G, which may be done by the foot of the attendant, so as to raise the back part of *a* and the front part of *b*, and then suddenly releasing the crank G, so that the parts *a b* may be forced back to their original position, the cut grain will be discharged from the platform.

I do not confine myself to the precise construction herein shown and described, for that may be varied or modified in various ways and the same end attained.

The invention is applicable to any of the known forms of reapers, and hence is modified to suit the particular kind of reaper to which it may be applied.

Having thus described my invention, I claim as new and desire to secure by Letters Patent—

1. A platform for reapers, constructed in such a manner that it may either automatically, or at the will of the driver or attendant, be made to tilt on a sliding axis arranged parallel with the finger-bar, or nearly so, and by said movement throw or discharge the cut grain from it, substantially as set forth.

2. The constructing of the platform of two or more parts connected by a joint or joints and arranged to operate in the manner substantially as described.

3. The arrangement of the crank G and springs *c d*, substantially as described, for operating the platform.

DAVID WOLF.

Witnesses:

ANTHONY S. ELY,
D. S. MATTHEWS